United States Patent Office 3,464,831
Patented Sept. 2, 1969

3,464,831
LIQUID PEPPER
John A. Ziegler, Scarborough, Ontario, Canada, assignor to The Griffith Laboratories, Incorporated, Chicago, Ill.
No Drawing. Filed July 6, 1965, Ser. No. 469,875
Int. Cl. A23l 1/26
U.S. Cl. 99—140                          6 Claims

ABSTRACT OF THE DISCLOSURE

Oleoresin of black pepper is subjected to physical force to separate a piperine fraction containing most of the piperine content of the oleoresin from a liquid fraction containing fixed and volatile oils and dissolved piperine, which liquid fraction is homogeneous and stable in storage at low temperatures.

---

This invention refers to the preparation and use of a completely homogeneous liquid pepper flavour which remains demonstrably free of sediment even after freezing and thawing, which contains no liquefying, solubilizing or diluting agents and which has utility in a wide variety of food products as a source of liquid pepper flavour.

It is an object of this invention to provide a homogeneous mobile liquid, free of sediment, which can be stored and used in liquid form to supply the flavour of black pepper when used in the preparation of various foodstuffs.

It is a second object of this invention to provide a full strength readily flowable liquid black pepper flavour free of liquefying or solubilizing agents which have the adverse effect of diluting the pepper flavour or of introducing foreign flavours.

It is another object of this invention to provide a liquid source of black pepper flavour which will not deposit crystals of piperine upon subsequent storage, even though it be exposed to low temperatures.

It is a further object of this invention to provide a liquid black pepper flavour completely miscible with and soluble in animal or vegetable fats or mixtures thereof whether they be liquid, semi-solid, or solid at normal temperatures.

It is an additional object of this invention to provide a liquid black pepper flavour which is mutually soluble with other spice essential oils and oleoresins thereby to produce liquid seasoning mixtures which, being completely homogeneous, do not require agitation prior to subsequent use.

It is yet an additional object of this invention to provide a homogeneous liquid black pepper flavour in which the pungency can be varied through solution therein of oleoresin capsicum.

Black pepper, which is one of the most widely used condiments, is derived as an article of commerce in the form of dried berries obtained from climbing vines belonging to the family Piperaceae of the species *Piper nigrum* L. The peppercorns are harvested at a stage of advanced maturity and just prior to full ripeness. After separation from undesirable matter, they are usually dried within three to four days by exposure in thin layers to the sun and the dried berries are then shipped to spice processors.

Although black pepper is commonly employed as a condiment in the form of the ground spice, a substantial quantity of pepper is subjected to a process of extraction in the presence of an organic solvent, selected from the group of hydrocarbons, alcohols, ketones, ethers, and chlorinated hydrocarbons, whereby the flavour bearing constituents of the spice are removed in a concentrated form from the non-flavoursome cellulosic, carbohydrate, protein and mineral constituents of the berry. The choice of solvent is governed by its selectivity for the flavour-bearing constituents for its low boiling point, its high volatility and ease of preferential removal from the flavour concentrate, its lack of toxicity, and by its applicability to the mechanical and physical requirements of the extraction equipment.

The extraction operation involves the percolation or co-habitation of the spice with the chosen solvent usually at or near its boiling point until the flavour bearing constituents of the spice have been substantially completely dissolved therefrom. The resulting solution, called miscella, is then subjected to a process of distillation to effect the removal of the solvent from the miscella to the maximum extent without damage or effect upon the many delicate chemical entities which together act to provide the taste and aroma sensation commonly accepted as black pepper flavour. When the solvent has been substantially completely removed, there results a thick oleaginous heterogeneous liquid called oleoresin black pepper. The manufacture of oleoresin black pepper is well known. A natural oleoresin of black pepper within the meaning of this specification is an oleoresin made directly from the spice and containing the percent composition of the spice as distinct from a reconstituted oleoresin, as will be referred to herein later.

Although oleoresin black pepper as a concentrated source of black pepper flavour may be up to or slightly more than ten times as strong in flavour strength as the ground parent spice, it is of limited utility as such for direct incorporation into foodstuffs largely because of its very high viscosity and heterogeneity. The oleoresin is grossly characterized as a mixture of volatile essential oils, fixed oils, and the pungent principal piperine. Typical analyses of the oleoresins obtained from black peppers of various origins may be given as follows:

| Type | Volatile oil, percent volume per weight basis | Fixed oil, percent by difference | Piperine, percent by weight, w./w. |
|---|---|---|---|
| Brazilian | 29–33 | 67–71 | 35–46 |
| Ceylon | 26–31 | 69–74 | 47–54 |
| Lampong | 29–34 | 66–71 | 43–48 |
| Malabar | 32–44 | 56–67 | 42–53 |
| Sarawak | 31–37 | 63–69 | 43–47 |
| Tellicherry | 30–41 | 59–70 | 39–46 |

In the foregoing chart, the volatile oil is given as a percent volume per unit weight. The fixed oil is determined by diverence from the volatile oil and, according to custom in the trade, it includes the piperine content of the oleoresin. The piperine in turn is given as a percent by weight of the weight of the oleoresin.

An oleoresin of black pepper, upon standing, will deposit crystals of piperine and assume a thick semi-solid consistency, and notwithstanding the fact that it is usually ground through a suitable comminuting machine prior to use, thereby to reduce the crystal size and, to some extent, to reduce the consistency, it is nevertheless demonstrable that in as little as thirty minutes standing after grinding, the oleoresin begins to separate due to settling of the piperine sediment so that it lacks homogeneity.

For use in many foodstuffs the availability of a perfectly homogeneous fluid source of black pepper flavour is greatly to be desired. To this end, efforts have been made in the past to solubilize the constituents of oleoresin black pepper by adding thereto various diluents in the form of alcohol, propylene glycol or various organic acids and esters. These attempts have been of very limited success owing to the fact that the total pepper flavour has been seriously weakened by dilution or altered by chemical reaction with the acids used to solubilize the piperine. It has not been possible hitherto to produce a liquid preparation having much more than 50 percent oleoresin content nor will any such preparation remain free of deposited sediment upon exposure to low temperatures, since much of the piperine will crystallize and settle out.

The liquid oil fraction of oleoresin consists essentially of a volatile oil and a non-volatile oil, and it has been established that the flavour of pepper resides in the liquid volatile and non-volatile oils of the oleoresin and that the pungency characteristic of pepper is principally due to its piperine content. The piperine crystallizes from the oleoresin because it is not very soluble therein. A relatively small amount of piperine is dissolved in the oil fraction. I have discovered, however, that the oleoresin may be usefully separated into a solid and a liquid fraction by a process involving the application of force thereto, such as centrifuging or forced filtration, and that the liquid fraction contains a relatively constant proportion of dissolved piperine which will not crystallize out even upon freezing and thawing. This liquid fraction carries the full pepper flavour characteristic of the oleoresin as well as a fair degree of pungency and may constitute as much as 75 percent of the weight of the original oleoresin. It is useful in this form and may be stored without crystallization or it may be blended with other seasoning ingredients as may be desired.

This invention consists essentially of a method of preparing a liquid black pepper extract from a liquid oleoresin of black pepper prepared in accordance with known methods and comprises the steps of separating the oleoresin into a liquid oil fraction and a piperine fraction by the application of force to the oleoresin, the said liquid oil fraction consisting essentially of liquid volatile oil, liquid non-volatile oil and dissolved piperine, the said piperine fraction consisting essentially of the piperine of said oleoresin that is not dissolved in the liquid oil fraction, the said liquid oil fraction constituting said liquid pepper extract.

An effective separation of the liquid oil fraction from the piperine fraction of black pepper oleoresin can be made by means of the application of force to the oleoresin. A centrifuge is an efficient manner of applying the force. Filtration either by pressure on the oleoresin before it passes through the filter or the application of a vacuum to the underside of a filter are also effective. The liquid oil fraction consists essentially of liquid volatile oil, liquid non-volatile oil and a certain quantity of dissolved piperine. The liquid oil fraction contains substantially no undissolved piperine, and it is of the essence of the invention that substantially all of the undissolved piperine be removed from the liquid oil fraction. It is only then that the liquid oil fraction can be stored without crystallization and blended at will with other seasoning ingredients under the conditions sought after in this invention. The separation of the liquid oil fraction by the application of force to the oleoresin to yield a liquid that has essentially only dissolved piperine will result. The yield of liquid pepper extract will vary, depending upon the origin of the oleoresin. As will be noted from the typical analysis of oleoresins obtained from various origins, the piperine content varies substantially, and since it is substantially undissolved piperine that is removed, the yield of pepper extract as a percent by weight of the liquid oleoresin will vary.

Although in the preferred application of this invention the oleoresin is separated by a process of centrifugation, it is to be understood that the method of separation is not limited to this process alone and that, in fact, any method of separation of solids from liquid mixture, such as screening, filtration and the like, may be employed. It is preferable to effect as complete a separation of the crystallized piperine from the liquid fraction as possible. Thus, I have found that, as a rule, 100 parts of oleoresin Malabar black pepper at 70–80° F. can be separated by centrifugation in what is commonly known as a perforate basket centrifuge to yield from 24–35 parts of a dry, friable solid residue analysing as high as 90 piperine content, and from 65–76 parts of a thin dark oily fluid hereinafter referred to as the supernatant fraction containing 11–14% piperine. This piperine content appears to represent an equilibrium state of solubility and will not separate further.

Because of the removal from the starting oleoresin of some of the piperine which contributes only heat or pungency to the overall taste sensation, the resulting supernatant fraction has more pure pepper flavour owing to its higher content of volatile and non-volatile essential oils.

The separation of an oleoresin that occurs as a result of settling is not complete enough for this invention. As indicated above, when an oleoresin of black pepper is permitted to stand, the piperine tends to settle to the bottom. It is possible to decant off a liquid oil fraction but the piperine portion left at the bottom of the vessel contains a very substantial part of the liquid oil fraction. It is not possible by settling and decantation to satisfactorily separate the oleoresin into a liquid oil fraction and a piperine fraction wherein the liquid oil fraction consists essentially of liquid volatile oil, liquid non-volatile oil and dissolved piperine and the piperine fraction consists essentially of piperine. It is essential that physical force be applied to the oleoresin. The mere natural force of gravity is not sufficient to achieve a satisfactory separation. The piperine fraction according to this invention comprise at least 60% piperine by weight. Preferably the piperine fraction contains 80 to 90% piperine by weight. It will be apparent that piperine in the piperine fraction is an indication of the efficiency of the separation because the materials not piperine are oils that could have been removed. It is considered that a piperine fraction with less than 60% piperine is a separation that is not useful within the scope of this invention.

The following examples illustrate the properties, preparation and characteristics of the new material.

Example I

One hundred pounds of black pepper ground to pass 32 mesh were charged into a Soxhlet type extractor and extracted with 45 gallons of N-hexane at the boiling point until no further soluble material was removed. The resulting solution of oleoresin in solvent, called miscella, was distilled at a temperature not in excess of 155° F. at atmospheric pressure until most of the solvent was removed, after which the pressure was lowered in the still to twenty-five inches of vacuum and the temperature raised to 180° F. while the oleoresin was agitated. This distillation procedure was continued until the residual solvent content of the oleoresin as determined by gas chromatography was not more than 25 parts per million, then the vacuum was released by introducing nitrogen gas into the still to atomspheric pressure. The oleoresin thus produced was discharged into a receiver as a thick fluid and the yield was 13 pounds. The oleoresin contained 42 percent piperine, 33 percent volatile oil and approximately 67 percent by difference fixed oil which contained the piperine, and after standing at room temperature for 48 hours the piperine crystallized, causing the oleoresin to become semi-solid and non-homogeneous.

Example II

One hundred pounds of black pepper of different geographical origin than that used in Example I, and ground to pass 32 mesh were charged into a percolation type extractor in a perforated basket and were extracted with 45 gallons of boiling methylene chloride until extraction was substantially complete. The miscella was distilled at atmospheric pressure at a temperature not exceeding 120° F. until most of the solvent was removed, then the pressure was lowered in the still to twenty-five inches of vacuum and the temperature raised to 150° F. with agitation of the oleoresin, the treatment continuing until the residual solvent content had been reduced to 40 parts per million. The vacuum was released by introducing nitrogen gas and the oleoresin thus produced was discharged, yielding 15 pounds 3 ounces, and containing 47.4 percent piperine and 30.5 percent volatile oil. After standing for less than 48 hours the oleoresin became semi-solid and non-homogeneous.

Example III

One hundred pounds of 32 mesh Malabar black pepper were extracted with boiling acetone and the miscella was desolventized to 135° F. at atmospheric pressure and at 150° F. at twenty-five inches of vacuum. The yield of oleoresin was 13 pounds 12 ounces, and it contained 46.5 percent piperine and 34 percent volatile oil. Within 48 hours the piperine crystallized and the oleoresin became non-homogeneous.

Example IV

The oleoresin resulting from Example I was ground in a hammer mill using a fine screen and 10 pounds of the ground oleoresin was filtered on a large Buchner funnel, using twenty-eight inches of vacuum. There resulted a semi-dry, friable residue weighing 4.2 pounds and containing 82 percent piperine, and 5.8 pounds of liquid filtrate, the supernatant fraction, containing 13.8 percent piperine. The piperine was essentially in solution and the supernatant fraction was liquid oils consisting essentially of volatile oils and non-volatile oils with dissolved piperine. The friable residue contained substantially all the undissolved piperine.

Example V

Ten pounds of ground oleoresin resulting from Example I were slowly poured into the 11 inch diameter perforated basket of an International Model EXD centrifuge operating at 3500 r.p.m., thereby applying a relative centrifugal force of about 2000 g. to the separating mixture. The centrifuging was continued until no more fluid emerged from the draining chamber and there resulted 3.9 pounds of easily friable residue containing 90% piperine and 6.1 pounds of supernatant fraction containing 11.5% piperine. The piperine was essentially in solution and the supernatant fraction was liquid oils consisting essentially of volatile oils and non-volatile oils with dissolved piperine. The friable residue contained substantially all of the undissolved piperine.

Example VI

Ten pounds of ground oleoresin resulting from Example II were treated according to the method described in Example IV with substantially the same results.

Example VII

Ten pounds of ground oleoresin resulting from Example II were treated in accordance with the method described in Example V with substantially the same results.

Example VIII

Ground oleoresin resulting from Example III was treated in accordance with the methods outlined in Examples IV and V with substantially the same results.

Example IX

Twenty-five hundred pounds of oleoresin black pepper produced in accordance with the method disclosed in Example I containing 40% piperine and 33% volatile oil were separated in a commercial scale perforated basket centrifuge to yield 826 pounds of residue containing 90% piperine and 2.7% volatile oil, and 1654 pounds of supernatant fraction containing 13.5% piperine and 48.5% volatile oil. Approximately 20 pounds of oleoresin were lost by "hold-up" in the system. The supernatant fraction contained substantially no piperine not in solution. It consisted essentially of the oils and dissolved piperine. The residue had a small percentage of oil but was substantially undissolved piperine.

Example X

In order to illustrate the stability of the product of this invention against separation or deposition of crystals or sediment when stored at low temperatures, samples of preparations made according to prior art as disclosed in United States Patents 2,626,218, 2,680,690, 2,778,738 and 2,860,054 were subjected to storage at temperatures noted below and were compared with the supernatant fraction resulting from Example IX.

| Preparation according to U.S. | Storage temperature, 21 days | | |
|---|---|---|---|
| | 50° F. | 32° F. | −10° F. |
| 2,626,218 | No sediment | Piperine crystallized. | Piperine crystallized. |
| 2,680,690 | Slight sediment | do | Do. |
| 2,778,738 | Fine sludge | do | Do. |
| 2,860,054 | No sediment | Slight sediment | Do. |
| This Invention | do | No sediment | No sediment. |

All examples of prior art would not withstand storage at freezing temperatures or below.

Example XI

To illustrate the complete miscibility of the product of this invention with various normally liquid vegetable oils in all proportions, the supernatant liquid oil fractions of this invention were added at levels ranging from 1 percent by weight to 99 percent by weight to corn oil, soybean oil, rapeseed oil and olive oil. In all cases, the solutions were completely homogeneous, and there was neither separation nor deposition of piperine crystals upon standing.

Example XII

To illustrate the complete miscibility of the product of this invention with various normally solid or semisolid fats, such as lard or hydrogenated vegetable shortenings, the supernatant liquid oil fractions of this invention were mixed therewith at various levels over the range of 1 to 99 percent by weight. In all cases, the mixtures were completely homogeneous and there was no evidence of separation or of deposition of piperine crystals. Beyond about 25 percent by weight of supernatant fraction, the mixtures remained semi-fluid at room temperature.

The product of this invention was by test uniquely completely soluble in and miscible with the following essential oils in all proportions: allspice, basil, bay, caraway, cardamom, celery, cinnamon, clove, coriander, garlic, ginger, mace, marjoram, nutmeg, onion, oregano, rosemary, sage, tarragon and thyme, as proved by dissolving the supernatant fraction singly and in combination in proportions by weight of from 1 to 99 percent thereof and observing a complete absence of evidence of separation or of deposition of piperine crystals.

The removal from oleoresin black pepper of the insoluble piperine fraction, leaving the supernatant fraction with an equilibrium content of dissolved piperine, yields a homogeneous liquid having a greatly increased pepper flavour but with reduced pungency. It is therefore possible for the first time to adjust, to any desired level, the heat content or pungency level, independently of purely black pepper flavour, in a completely homogeneous liquid seasoning by admixture of the supernatant fraction in any proportion with oleoresin of capsicum. Such mixtures again are completely stable against separation, do not deposit crystals or sediment upon standing even at −10° F. and therefore do not require agitation and mixing before use.

It is not unusual in the trade for an oleoresin of black pepper to be required having specified values of volatile oil and piperine contents. If, for example, the piperine content requirement is higher than that which may be obtained by extracting a given variety of black pepper because the piperine content of the latter is lower than the value theoretically required to produce an oleoresin having the required analysis, the product of this invention is uniquely useful as a means of "tailor making" an oleoresin pepper with a volatile oil and piperine content variable over a very wide range, and wider, in fact, than that possible with an unseparated oleoresin.

In a meritable practice of this invention, there is obtained through the application of force, such as centrifugation or filtration to an oleoresin of papper, a liquid oil fraction and a relatively dry, friable solid fraction consisting principally of piperine. A typical analysis of these fractions would be as follows:

|  | Volatile oil, percent | Piperine, percent |
|---|---|---|
| Oleoresin black pepper | 33 | 39 |
| Liquid oil fraction | 48.5 | 13.5 |
| Piperine residue | 2.7 | 90 |

It is therefore possible by recombining the separated liquid oil fraction and the piperine residue in suitable proportions to reconstitute an oleoresin pepper having any piperine content between about 13.5% and 90% on a weight/weight basis and any volatile oil content between about 2.7% and 48.5% on a volume/weight basis.

It will moreover be apparent to one skilled in the art that because of the unique miscibility of the product of this invention with so-called neutral diluents, such as liquid or semi-solid vegetable oils, which of themselves, contain neither volatile oil no piperine constituents, it is further possible to extend the aforementioned lower limits both of piperine and volatile oil downwards so that an almost infinitely variable composition may be achieved over the range between zero percent and the maximum available volatile oil and/or piperine contents of the respective fractions.

The following examples will serve to illustrate the foregoing.

Example XIII

Various weights of the liquid oil fraction and of the piperine residue were combined and the resulting mixtures or blends contained volatile oil and piperine in the percentages listed in the accompanying table. Also demonstrated is the effect on the volatile oil and piperine contents when vegetable oil, such as rapeseed oil, was added to the two fractions.

| Pounds of liquid oil fraction | Pounds of piperine residue | Pounds of vegetable oil | Analysis of resulting blend | |
|---|---|---|---|---|
| | | | Volatile oil, percent | Piperine, percent |
| 100 | 0 | 0 | 48.5 | 13.5 |
| 75 | 25 | 0 | 37.0 | 32.6 |
| 50 | 50 | 0 | 25.3 | 51.7 |
| 25 | 75 | 0 | 14.1 | 70.8 |
| 0 | 100 | 0 | 2.7 | 90.0 |
| 75 | 0 | 25 | 36.3 | 10.1 |
| 50 | 0 | 50 | 24.2 | 6.7 |
| 25 | 0 | 75 | 12.1 | 3.3 |
| 1 | 0 | 99 | 0.5 | 0.1 |
| 0 | 75 | 25 | 2.0 | 67.5 |
| 0 | 50 | 50 | 1.3 | 45.0 |
| 0 | 25 | 75 | 0.6 | 22.5 |
| 0 | 1 | 99 | 0.03 | 0.9 |

What I claim as my invention is:

1. A method of preparing a stabilized liquid black pepper extract from a liquid oleoresin of black pepper, comprising the steps of separating the oleoresin into a liquid oil fraction and a solid fraction by the application of physical force to the oleoresin for a period of time such that the said liquid oil fraction consists essentially of liquid volatile oil, liquid non-volatile oil and dissolved piperine, and the said solid fraction consists essentially of at least 60% by weight piperine, the said liquid oil fraction constituting said liquid pepper extract.

2. A method of preparing a liquid pepper extract as claimed in claim 1, in which said solid fraction has at least 75% piperine by weight.

3. A method of preparing a liquid pepper extract as claimed in claim 1, in which said solid fraction has at least 80% piperine by weight.

4. A method of preparing a liquid pepper extract as claimed in claim 1, in which said solid fraction has at least 90% piperine by weight.

5. A method of producing a stabilized liquid black pepper composition which consists of firstly, separating a liquid oleoresin of black pepper into a liquid fraction and a solid fraction by the application of physical force for a period of time such that the said liquid fraction consists essentially of liquid volatile oil, liquid non-volatile oil and dissolved piperine, and the said solid fraction contains from 60% to 90% by weight of piperine, and secondly, adding to said liquid fraction a predetermined portion of said solid fraction, whereby to control the piperine content of the mixture.

6. A method of producing a stabilized liquid black pepper composition which consists of firstly, separating a liquid oleoresin of black pepper into a liquid fraction and a solid fraction by the application of physical force for a period of time such that the said liquid fraction consists essentially of liquid volatile oil, liquid non-volatile oil and dissolved piperine, and the said solid fraction contains from 60% to 90% by weight of piperine, and secondly, adding to said liquid fraction a predetermined portion of said solid fraction, whereby to control the piperine content of the mixture, and then adding a neutral diluent.

References Cited

UNITED STATES PATENTS

| 2,626,218 | 1/1953 | Johnstone et al. | 99—140 |
| 2,778,738 | 1/1957 | Fagen | 99—140 |
| 2,860,054 | 11/1958 | Yanick | 99—140 |

MAURICE W. GREENSTEIN, Primary Examiner

H. H. KLARE III, Assistant Examiner

U.S. Cl. X.R.

260—236.5